(12) United States Patent
Xu et al.

(10) Patent No.: US 12,567,646 B2
(45) Date of Patent: Mar. 3, 2026

(54) BATTERY

(71) Applicant: CALB Co., Ltd., Suzhou (CN)

(72) Inventors: Jiuling Xu, Changzhou (CN); Yongjie Zhang, Luoyang (CN); Hao Zhao, Changzhou (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 526 days.

(21) Appl. No.: 17/900,824

(22) Filed: Aug. 31, 2022

(65) Prior Publication Data

US 2023/0411770 A1     Dec. 21, 2023

(30) Foreign Application Priority Data

Jun. 20, 2022    (CN) .......................... 202210699666.5

(51) Int. Cl.
H01M 50/342 (2021.01)
H01M 50/103 (2021.01)
H01M 50/55 (2021.01)

(52) U.S. Cl.
CPC ..... H01M 50/3425 (2021.01); H01M 50/103 (2021.01); H01M 50/55 (2021.01); *H01M 2200/20* (2013.01)

(58) Field of Classification Search
CPC ........... H01M 50/3425; H01M 50/103; H01M 50/55; H01M 2200/20; H01M 50/553; H01M 50/131; H01M 10/0436; Y02E 60/10
See application file for complete search history.

(56) References Cited

U.S. PATENT DOCUMENTS

| | | | |
|---|---|---|---|
| 2007/0099070 A1 | 5/2007 | Aizawa et al. | |
| 2014/0030564 A1* | 1/2014 | Lee ..................... | H01M 50/124 |
| | | | 429/82 |
| 2014/0205877 A1 | 7/2014 | Kim | |
| 2022/0059900 A1 | 2/2022 | Li et al. | |

FOREIGN PATENT DOCUMENTS

| | | | |
|---|---|---|---|
| CN | 1960027 | | 5/2007 |
| CN | 101170165 | | 4/2008 |
| CN | 213212237 U | * | 5/2021 |
| CN | 114614068 | | 6/2022 |

(Continued)

OTHER PUBLICATIONS

English Machine Translation of CN 213212237 U (Year: 2025).*

(Continued)

*Primary Examiner* — Nicole M. Buie-Hatcher
(74) *Attorney, Agent, or Firm* — JCIP GLOBAL INC.

(57) ABSTRACT

A battery includes an explosion-proof valve and a battery casing. The explosion-proof valve is arranged in the battery casing. The explosion-proof valve includes a first straight line segment, a second straight line segment and a circular arc segment. Two ends of the circular arc segment are respectively connected to the first straight line segment and the second straight line segment. Lengths of the first straight line segment and the second straight line segment are respectively a and b, and an arc length of the circular arc segment is c, a radius of curvature of the circular arc segment is r, and $0.8 \le a/b \le 1.2$ and $0.5 \le c/r \le 2.7$ are satisfied.

12 Claims, 3 Drawing Sheets

(56)                           References Cited

FOREIGN PATENT DOCUMENTS

| | | | |
|---|---|---|---|
| CN | 114628846 | 6/2022 | |
| CN | 217522179 | 9/2022 | |
| EP | 2037514 | 3/2017 | |
| KR | 20120095698 | 8/2012 | |
| WO | WO-2021036685 A1 * | 3/2021 | ........ H01M 10/0525 |

OTHER PUBLICATIONS

English Machine Translation of WO 2021036685 A1 (Year: 2025).*
"Search Report of Europe Counterpart Application", issued on Sep. 14, 2023, p. 1-p. 9, for Application No. 22194028.1-1108.
"Office Action of China Counterpart Application", issued on Nov. 21, 2025, p. 1-p. 6.
"Office Action of India Counterpart Application", issued on Nov. 20, 2025, p. 1-p. 7.

* cited by examiner

BATTERY

CROSS-REFERENCE TO RELATED APPLICATION

This application claims the priority benefit of China application no. 202210699666.5, filed on Jun. 20, 2022. The entirety of the above-mentioned patent application is hereby incorporated by reference herein and made a part of this specification.

BACKGROUND

Technical Field

The present disclosure relates to the technical field of batteries, and in particular, to a battery.

Description of Related Art

After a battery is used for a long time, a large amount of heat may be collected inside the battery, which will cause the internal pressure of the battery to be too high. If the internal pressure of the battery is not released in time, the internal pressure might cause safety problems.

In the related art, explosion-proof valves are normally used to release pressure of the battery. However, due to the limitation of the structure of the explosion-proof valve, it is difficult to control the timing of explosion of the explosion-proof valve.

SUMMARY

The present disclosure provides a battery.

The disclosure provides a battery. The battery includes an explosion-proof valve and a battery casing. The explosion-proof valve is arranged in the battery casing, the explosion-proof valve includes a first straight line segment, a second straight line segment and a circular arc segment, and two ends of the circular arc segment are respectively connected to the first straight line segment and the second straight line segment. At least one of the first straight line segment, the second straight line segment and the circular arc segment may be broken through. A length of the first straight line segment and a length of the second straight line segment are respectively a and b, and an arc length of the circular arc segment is c, a radius of curvature of the circular arc segment is r, and $0.9 \leq a/b \leq 1.9$ and $0.5 \leq c/r \leq 2.7$ are satisfied.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
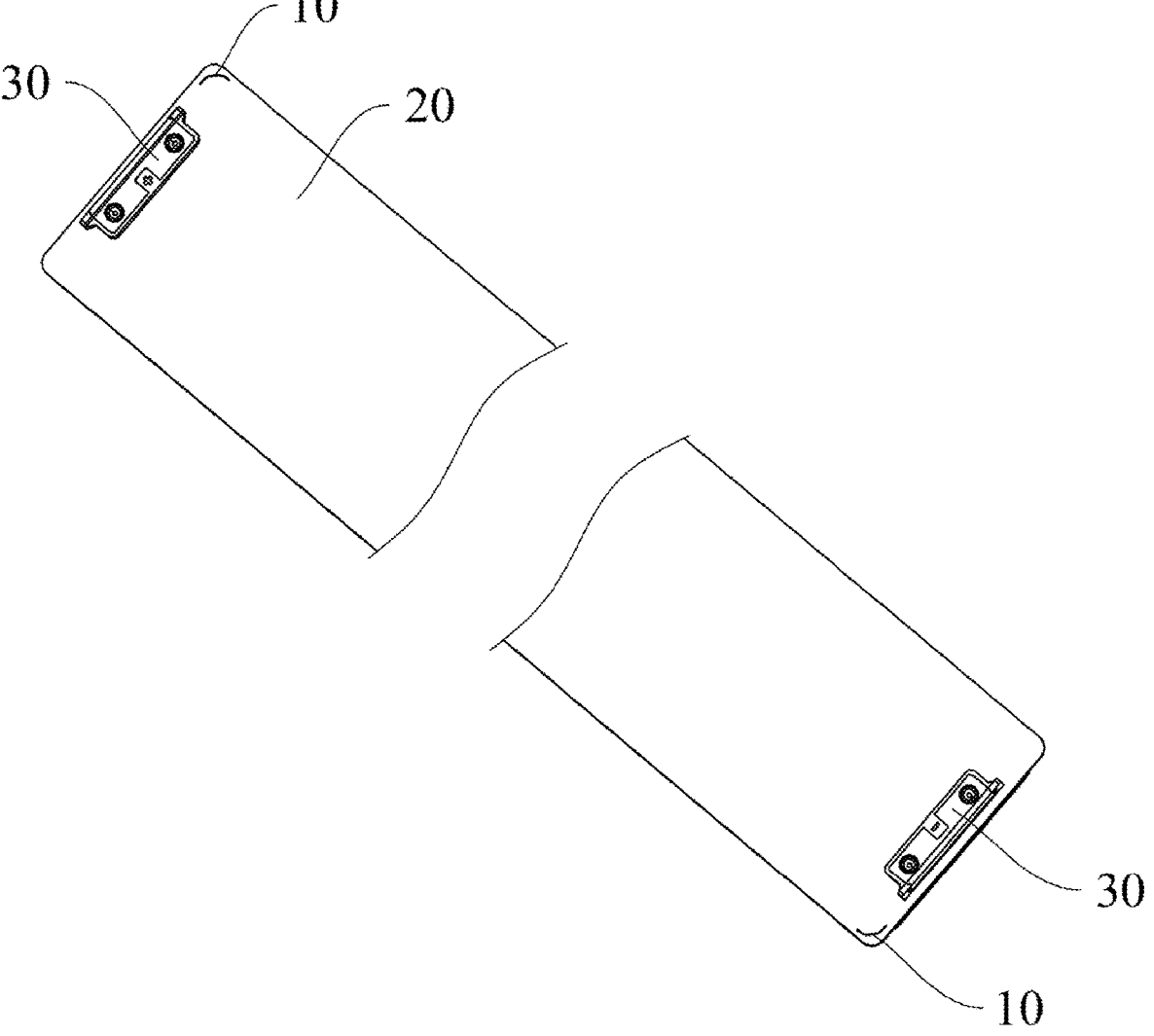
FIG. 1 is a schematic partial structural view of a battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the disclosure provides a battery. Please refer to FIG. 1 to FIG. 4, the battery includes an explosion-proof valve 10 and a battery casing 20. The explosion-proof valve 10 is arranged in the battery casing 20. The explosion-proof valve 10 includes a first straight line segment 11, a second straight line segment 12 and a circular arc segment 13, and two ends of the circular arc segment 13 are respectively connected to the first straight line segment 11 and the second straight line segment 12. A length of the first straight line segment 11 and a length of the second straight line segment 12 are respectively a and b, and an arc length of the circular arc segment 13 is c, a radius of curvature of the circular arc segment 13 is r, and $0.9 \leq a/b \leq 1.1$ and $0.5 \leq c/r \leq 2.7$ are satisfied. When the internal pressure of battery casing 20 reaches the preset value, at least one of the first straight line segment 11, the second straight line segment 12 and the circular arc segment 13 may be broken through.

The battery in an embodiment of the present disclosure includes an explosion-proof valve 10 and a battery casing 20, and the explosion-proof valve 10 is arranged in the battery casing 20, so that when the internal pressure of the battery casing 20 reaches a preset value, the explosion-proof valve 10 may be broken through to realize the explosion-proof effect. By setting the explosion-proof valve 10 as the first straight line segment 11, the second straight line segment 12 and the circular arc segment 13, and the two ends of the circular arc segment 13 are respectively connected to the first straight line segment 11 and the second straight line segment 12, the length of the first straight line segment 11 and the length of the second straight line segment 12 are a and b respectively, the arc length of the circular arc segment 13 is c, and the radius of curvature of the circular arc segment 13 is r. By setting $0.9 \leq a/b \leq 1.1$ and $0.5 \leq c/r \leq 2.7$, the stress distribution at the explosion-proof valve 10 may be effectively controlled, so as to ensure that the explosion-proof valve 10 may burst open when the internal pressure of the battery casing 20 reaches the preset value, such that reliable explosion-proof function may be achieved, thereby improving the safety performance of the battery. In the meantime, it may be ensured that the explosion-proof valve 10 will not explode unexpectedly when the internal pressure of the battery is not higher than the preset value.

It should be noted that the explosion-proof valve 10 includes a first straight line segment 11, a second straight line segment 12 and a circular arc segment 13. The first straight line segment 11 may extend along the first linear direction, and the second straight line segment 12 may extend along the second linear direction, and the circular arc segment 13 may extend along the circular arc direction.

When the internal pressure of the battery casing 20 reaches a preset value, at least one of the first straight line segment 11, the second straight line segment 12 and the circular arc segment 13 may be broken through. The first straight line segment 11, the second straight line segment 12 and the circular arc segment 13 may burst the fragile region of the explosion-proof valve 10, such that the explosion-proof effect may be achieved, and that the gas inside the battery casing 20 may be discharged in time to avoid causing safety problems.

Figure 4:
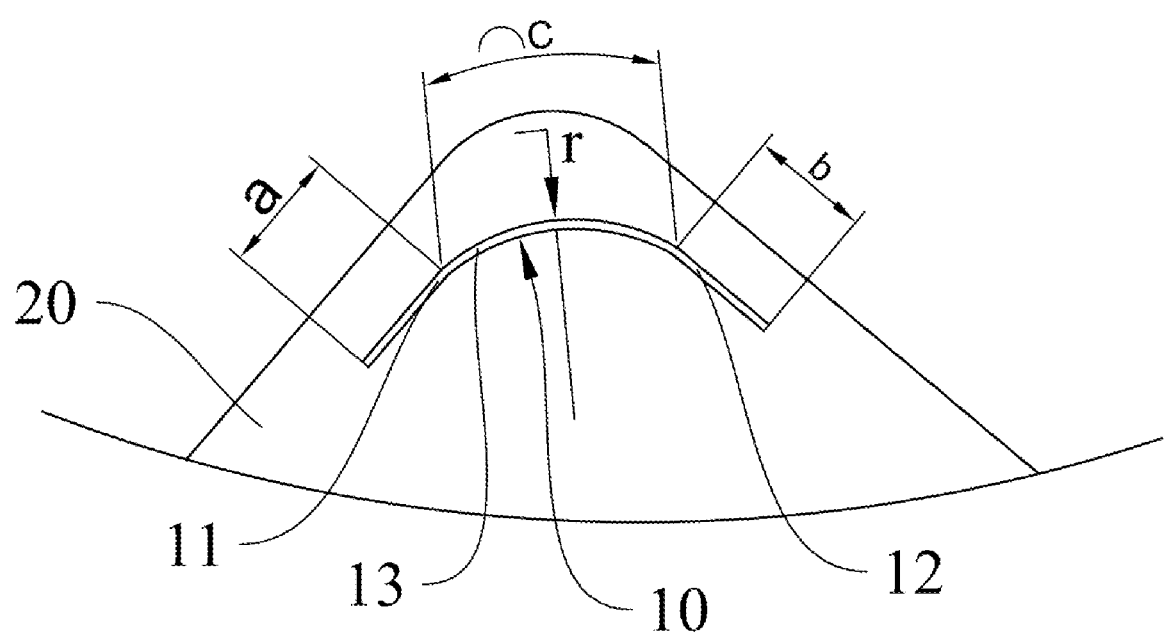
FIG. 4 is another schematic view of a partial structure of a battery according to an exemplary embodiment.

With reference to FIG. 4, the length of the first straight line segment 11 is a, the length of the second straight line segment 12 is b, the arc length of the circular arc segment 13 is c, and the radius of curvature of the circular arc segment 13 is r. By setting $0.9 \leq a/b \leq 1.1$ and $0.5 \leq c/r \leq 2.7$, the stress distribution at the explosion-proof valve 10 may be effectively controlled, thereby ensuring that the explosion-proof valve 10 may burst open when the internal pressure of the battery casing 20 reaches a preset value.

The length of the first straight line segment 11 is a, the length of the second straight line segment 12 is b, and the equation of $0.9 \leq a/b \leq 1.1$ is satisfied. In this way, the length of the first straight line segment 11 and the length of the second straight line segment 12 are substantially the same, so that the circular arc segment 13 in the middle and the first straight line segment 11 and the second straight line segment 12 between the two ends form a symmetrical structure, and the stress applied on the circular arc segment 13 is uniform, which makes it easy for the circular arc segment 13 to burse open under a specific pressure. Also, stress concentration is easily achieved in the first straight line segment 11 and the second straight line segment 12, thereby facilitating the explosion of the explosion-proof valve 10 and effectively improving the safety performance of the battery.

The arc length of the circular arc segment 13 is c, the radius of curvature of the circular arc segment 13 is r, and the equation of $0.5 \leq c/r \leq 2.7$ is satisfied. In this manner, the magnitude of the stress concentration may be effectively controlled, so as to ensure that the explosion-proof valve 10 is burst open when the internal pressure of the battery casing 20 reaches the preset value, thereby releasing the internal pressure of the battery casing 20, and ensuring the safety performance of the battery.

When the ratio of the arc length of the circular arc segment 13 to the radius of curvature of the circular arc segment 13 is too large, the angle corresponding to the circular arc segment 13 will be too large, which will make it difficult for the stress to concentrate, and therefore it will be difficult for the explosion-proof valve 10 to burst open, and safety issues will arise. When the ratio of the arc length of the circular arc segment 13 to the radius of curvature of the circular arc segment 13 is too small, the angle corresponding to the circular arc segment 13 will be too small, which will make it easy for the stress to concentrate, and it will be difficult to control the stress of the explosion-proof valve 10. Under the circumstances, the explosion-proof valve 10 is likely to explode easily, which might affect the normal use of the battery.

In an embodiment, the ratio between the length a of the first straight line segment 11 and the length b of the second straight line segment 12 may be 0.9, 0.95, 0.97, 1, 1.05, 1.08, or 1.1, or the like.

In an embodiment, the equation of $1 \leq c/r \leq 2.1$ is satisfied, and therefore it is possible to effectively control the magnitude of the stress concentration, so as to ensure that the explosion-proof valve 10 will burst open when the internal pressure of the battery casing 20 reaches a preset value, thereby releasing the internal pressure of the battery casing 20 to ensure the safety performance of the battery.

In an embodiment, the ratio of the arc length c of the circular arc segment 13 to the curvature radius r of the circular arc segment 13 may be 0.5, 0.6, 0.7, 0.8, 0.9, 1, 1.1, 1.2, 1.5, 1.57, 1.8, 2, 2.1, 2.3, 2.5, 2.6 or 2.7, etc.

In an embodiment, the angle corresponding to the circular arc segment 13 may be 60° to 120°, and the angle corresponding to the circular arc segment 13 may be 60°, 65°, 70°, 75°, 80°, 90°, 95°, 100°, 105° or 120°, etc.

In an embodiment, the equations of 1 mm $\leq$ a $\leq$ 40 mm and 1 mm $\leq$ b $\leq$ 40 mm are satisfied. By controlling the length of the first straight line segment 11 and the length of the second straight line segment 12 between 1 mm and 40 mm, not only it may be ensured that stress concentration may be easily achieved in the first straight line segment 11 and the second straight line segment 12, but also it may be ensured that the first straight line segment 11 and the second straight line segment 12 may burst open under a preset pressure.

When the length of the first straight line segment 11 and the length of the second straight line segment 12 are relatively small, which will cause the circular arc segment 13 to account for a large proportion of the entire explosion-proof valve 10, and therefore it is difficult for the first straight line segment 11 and the second straight line segment 12 to achieve a stress concentration effect. When the length of the first straight line segment 11 and the length of the second straight line segment 12 are relatively large, which will cause the entire explosion-proof valve 10 to have excessively concentrated stress, and therefore the explosion-proof valve 10 fails to burst open under the preset pressure, which affects the normal use of the battery.

In an embodiment, the length of the first straight line segment 11 may be 1 mm, 1.5 mm, 2 mm, 3 mm, 5 mm, 10 mm, 15 mm, 20 mm, 25 mm, 28 mm, 30 mm, 35 mm, 37 mm, 38 mm, 39 mm or 40 mm, and so on.

In an embodiment, the width of the first straight line segment 11, the width of the second straight line segment 12 and the width of the circular arc segment 13 are all the same, so as to facilitate the processing and molding of the structure, thereby improving the molding efficiency of the explosion-proof valve 10, and improving the molding efficiency of the battery.

In an embodiment, the explosion-proof valve 10 is arranged in the corner region of the battery casing 20, which can not only make it possible to reasonably arrange the setting position of the explosion-proof valve 10, but also it is possible to prevent the gas or liquid in the battery casing 20 from being sprayed toward the adjacent battery after the explosion-proof valve 10 is burst open, thereby avoiding affecting adjacent battery.

The battery casing 20 may be a square casing, and the square casing may have four corner regions. Under the circumstances, the explosion-proof valve 10 may be arranged at one of the corner regions of one surface, or the explosion-proof valve 10 may be arranged at the intersection region of two adjacent surfaces. For example, the battery casing 20 includes two opposite first surfaces 21 and four second surfaces 22 disposed around the first surfaces 21, and the explosion-proof valve 10 may be disposed at any one of the four corner regions of the first surface 21. Alternatively, the explosion-proof valve 10 may be arranged at the intersection region of two adjacent second surfaces 22. Alternatively, the explosion-proof valve 10 may be arranged at the intersection region of the first surface 21 and the second surface 22. Alternatively, the explosion-proof valve 10 may be arranged at any of the four corner regions of the second surface 22.

Figure 2:
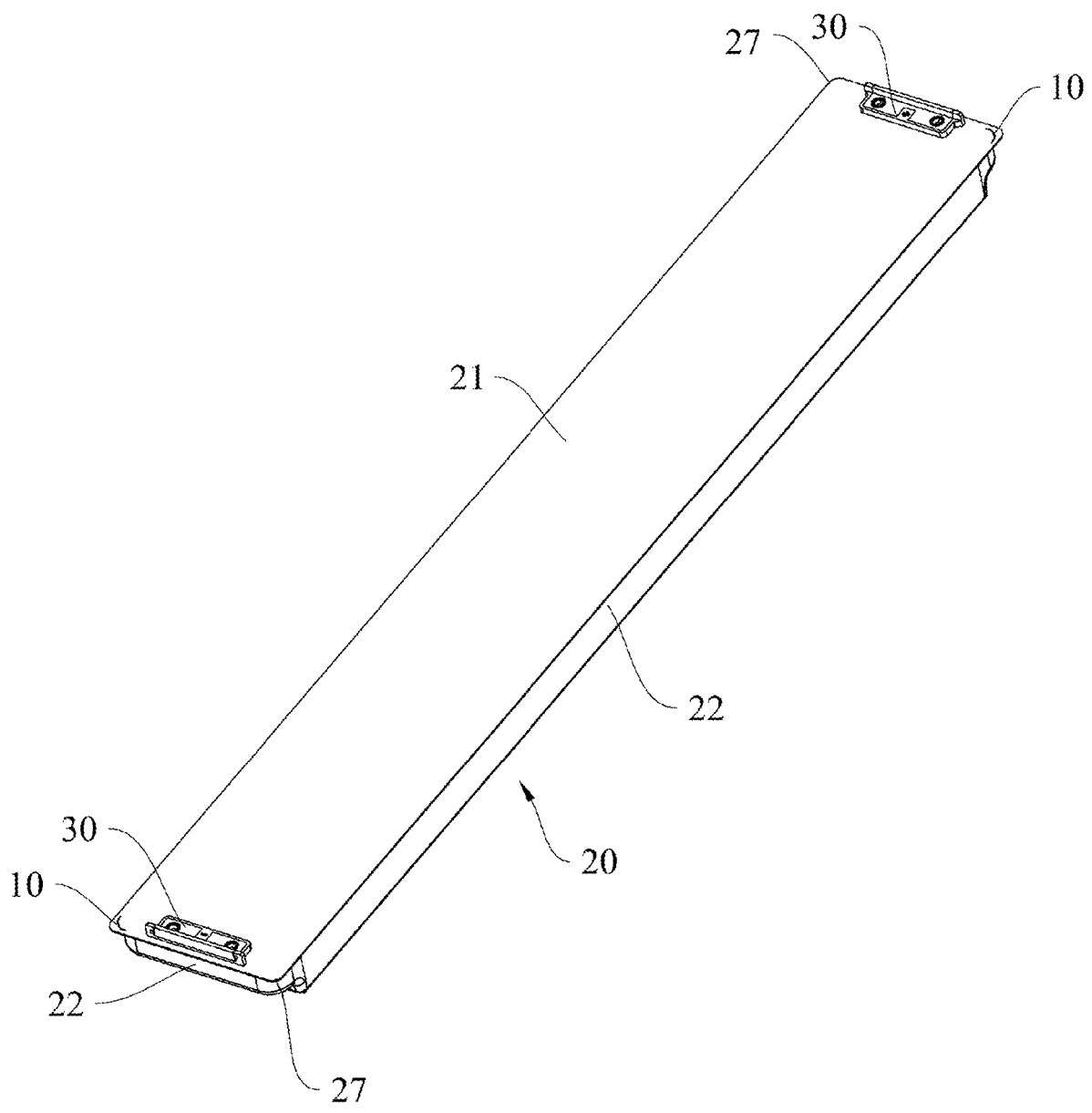
FIG. 2 is a schematic structural view of a battery according to an exemplary embodiment.

In an embodiment, as shown in FIG. 2, the battery casing 20 includes two opposite first surfaces 21 and four second surfaces 22 arranged around the first surfaces 21. The explosion-proof valve 10 is arranged at the corner region of the first surface 21, so that the explosion-proof valve 10 may be as close as possible to the edge of the battery casing 20. In this way, to the possibly greatest extent, it may be prevented that the gas and liquid in the battery casing 20 are sprayed toward the adjacent battery after the explosion-proof valve 10 is burst open, so as to improve the safety performance of the battery.

The corner region of the first surface 21 may be understood as the location where both ends of the diagonal line of the first surface 21 are located. The first surface 21 may be a substantially rectangular surface, and under the circumstances, the first surface 21 may have four corner regions.

In an embodiment, a circular arc transition segment is formed between two adjacent second surfaces 22. The minimum vertical distance between the first straight line segment 11 and one second surface 22 is less than 10 mm, the minimum vertical distance between the second straight line segment 12 and another second surface 22 is less than 10 mm, and the minimum vertical distance between the circular arc segment 13 and the circular arc transition segment is less than 20 mm. In this manner, the explosion-proof valve 10 may be as close as possible to the circumferential outer edge of the battery casing 20. In this way, not only that the space utilization rate of the battery casing 20 may be improved, but also the probability that the gas and liquid in the battery casing 20 are sprayed toward the adjacent batteries may be reduced after the explosion-proof valve 10 is burst open.

It should be noted that, as shown in FIG. 2, the battery casing 20 may have a flange structure 27, and the flange structure 27 is arranged around the circumferential outer surface of the battery casing 20.

The battery casing 20 includes two opposite first surfaces 21 and four second surfaces 22 disposed around the first surfaces 21. Herein, the first surfaces 21 and the second surfaces 22 may not include the surface formed by the flange structure 27, such that it may be ensured that the gas inside the battery casing 20 is in contact with the explosion-proof valve 10, so as to ensure that the explosion-proof valve 10 may be broken through when the internal pressure of the battery casing 20 reaches a preset value.

Regarding the minimum vertical distance between the first straight line segment 11 and one second surface 22 being less than 10 mm, the minimum vertical distance between the second straight line segment 12 and another second surface 22 being less than 10 mm, the minimum vertical distance between the circular arc segment 13 and the circular arc transition segment being less than 20 mm, it may be considered that after the flange structure 27 of the battery casing 20 is completely removed, the minimum distance between the first straight line segment 11 and the circumferential edge of the first surface 21 is less than 10 mm, the minimum distance between the second straight line segment 12 and the circumferential edge of the first surface 21 is less than and the minimum distance between the circular arc segment 13 and the circumferential edge of the first surface 21 is less than 20 mm.

Figure 3:
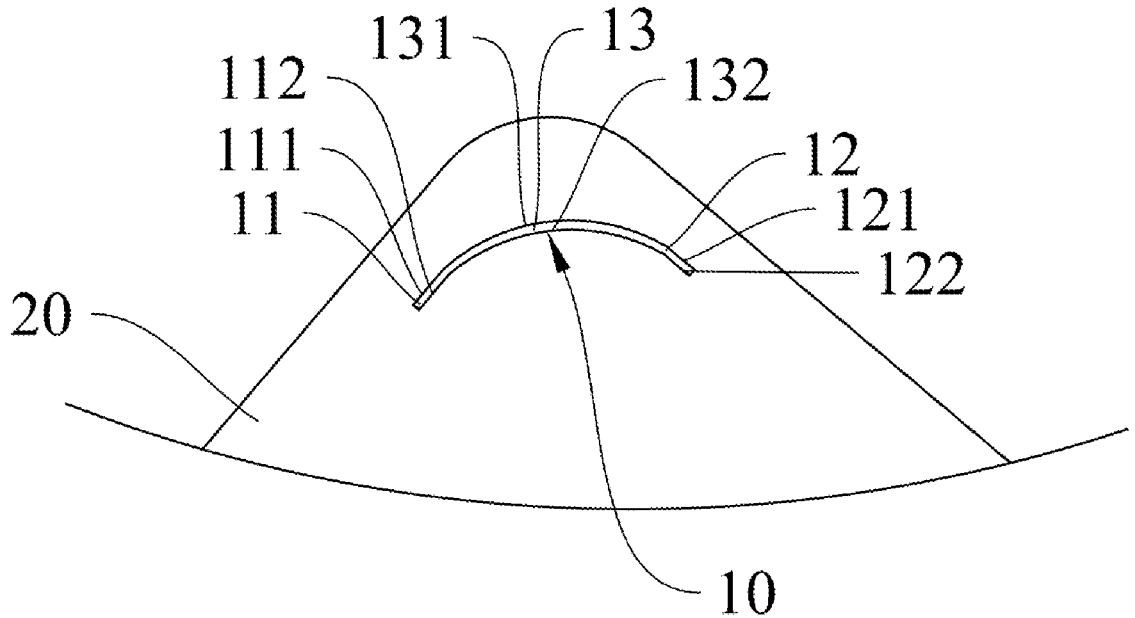
FIG. 3 is a schematic view of a partial structure of a battery according to an exemplary embodiment.

In an embodiment, as shown in FIG. 3 and FIG. 4, at least a part of the circular arc segment 13 protrudes toward the circular arc transition segment adjacent thereto, that is, the at least a part of the circular arc segment 13 is close to the circumferential edge of the first surface 21, so that the distance between the circular arc segment 13 and the corner region of the circumferential edge of the first surface 21 is relatively small.

In an embodiment, at least a part of the circular arc segment 13 protrudes in the manner of facing away from the circular arc transition segment adjacent thereto, that is, the at least a part of the circular arc segment 13 is arranged in the manner of facing away from the circumferential edge of the first surface 21, so as to control the distance between the circular arc segment 13 and the circular arc transition segment and to control the explosion pressure of the explosion-proof valve 10.

In an embodiment, the battery casing 20 includes two opposite first surfaces 21 and four second surfaces 22 arranged around the first surfaces 21. The explosion-proof valve 10 is arranged in the corner region of the first surface 21, and the first straight line segment 11 and the second straight line segment 12 are respectively parallel to the two adjacent second surfaces 22. Furthermore, the first straight line segment 11 is substantially parallel to the second surface 22 adjacent thereto, and the second straight line segment 12 is substantially parallel to the second surface 22 adjacent thereto, so that the distance between the first straight line segment 11 and one second surface 22 is consistent, and the distance between the second straight line segment 12 and another second surface 22 is consistent. In this way, the stress may be easily concentrated, so that the explosion-proof valve 10 may be easily exploded, thereby improving the safety performance of the battery.

The length of the first straight line segment 11 is a, the length of the second straight line segment 12 is b, the equation of $0.9 \leq a/b \leq 1.1$ is satisfied, and the first straight line segment 11 and the second straight line segment 12 are respectively parallel to the two adjacent second surfaces 22. Through such configuration, the first straight line segment 11 and the second straight line segment 12 may substantially form a cantilever symmetrical structure, and it is easy to achieve stress concentration, thereby avoiding excessive length difference between the first straight line segment 11 and the second straight line segment 12, so that it will not be difficult for the explosion-proof valve 10 to burst open.

In an embodiment, as shown in FIG. 3 and FIG. 4, at least a part of the circular arc segment 13 protrudes toward the circumferential edge of the first surface 21, that is, the at least a part of the circular arc segment 13 is close to the circumferential edge of the first surface 21. In this way, the distance between the circular arc segment 13 and the corner region of the circumferential edge of the first surface 21 is relatively small.

In an embodiment, at least a part of the circular arc segment 13 protrudes toward the middle region of the first surface 21, that is, the at least a part of the circular arc segment 13 is disposed in the manner of facing away from the circumferential edge of the first surface 21, so as to control the distance between the circular arc segment 13 and the circular arc transition segment, and to control the explosion pressure of the explosion-proof valve 10.

It should be noted that, at least a part of the circular arc segment 13 protrudes toward a certain position, or the at least a part of the circular arc segment 13 protrudes in the manner of facing away from a certain position, which mainly reflects the extending trend of the circular arc segment 13. For example, taking at least a part of the circular arc segment 13 protruding toward the circumferential edge of the first surface 21 as an example, as shown in FIG. 4, the first straight line segment 11, the circular arc segment 13, and the second straight line segment 12 constituting the explosion-proof valve 10 substantially form a bent structure, and the explosion-proof valve 10 as a whole may be regarded as protruding toward the circumferential edge of the first surface 21, that is, the opening formed by the explosion-proof valve 10 is disposed in the manner of facing away from the corner region of the circumferential edge. Taking at least a part of the circular arc segment 13 protruding toward the middle region of the first surface 21 as an example, the first straight line segment 11, the circular arc segment 13, and the second straight line segment 12 constituting the explosion-proof valve 10 substantially form a bent structure, and the explosion-proof valve 10 as a whole may be regarded as protruding in the manner of facing away from the circumferential edge of the first surface 21, that is, the opening formed by the explosion-proof valve 10 is disposed toward the corner region of the circumferential edge.

It should be noted that the terms "basic" and "substantially" used in the embodiments refer to the results obtained under the conditions of taking processing errors, configuration errors, etc. into consideration. For example, the first straight line segment 11 is substantially parallel to the second surface 22 adjacent thereto, and the second straight line segment 12 is substantially parallel to the second surface 22 adjacent thereto. When processing errors, and configuration errors, etc. are ignored, it may be regarded that the first straight line segment 11 is parallel to the second surface 22 adjacent thereto, and the second straight line segment 12 is parallel to the second surface 22 adjacent thereto.

In an embodiment, the battery casing 20 includes two opposite first surfaces 21 and four second surfaces 22 arranged around the first surfaces 21. The area of each first surface 21 is larger than the area of each second surface 22. The explosion-proof valve 10 is disposed on the first surface 21, so that the first surface 21 may provide a reliable support surface for the explosion-proof valve 10, and may facilitate the configuration of the explosion-proof valve 10, thereby improving the safety protection performance of the explosion-proof valve 10.

It should be noted that the two opposite first surfaces 21 are larger surfaces of the battery casing 20, and the four second surfaces 22 are smaller surfaces of the battery casing 20. The four second surfaces 22 include two pairs of smaller surfaces, that is, the first pair of smaller surfaces extending along the length direction of the battery casing 20, and the second pair of smaller surfaces extending along the width direction of the battery casing 20. Moreover, the area of each of the first pair of smaller surfaces should be larger than the area of each of the second pair of smaller surfaces, but smaller than the area of each of the larger surfaces.

In an embodiment, the explosion-proof valve 10 and the battery casing 20 may be provided separately, that is, the battery casing 20 may be provided with an explosion-proof hole, and the explosion-proof valve 10 is connected to the battery casing 20, so as to realize the blocking of the explosion-proof hole. Under the circumstances, the explosion-proof valve 10 may include a first straight line segment 11, a second straight line segment 12 and a circular arc segment 13, so that the first straight line segment 11, the second straight line segment 12 and the circular arc segment 13 may be served as fragile portions of the explosion-proof valve 10. In this way, the fragile portion bursts open to release pressure when the internal pressure in the battery casing 20 reaches a preset value.

In an embodiment, the explosion-proof valve 10 and at least a part of the battery casing 20 are an integrally-formed structure, which not only has a simple structure, but also can reduce the manufacturing process, thereby improving the molding efficiency of the explosion-proof valve 10.

The explosion-proof valve 10 and at least a part of the battery casing 20 are an integrally-formed structure. For example, a part of the battery casing 20 may be thinned to form the explosion-proof valve 10. Alternatively, during the molding process, the battery casing 20 may be partially thinned to serve as the explosion-proof valve 10, so as to realize the pressure release function, such that the process is relatively simple, and that the molding efficiency of the explosion-proof valve 10 may be improved.

It should be noted that the explosion-proof valve 10 may include a fragile portion, and the fragile portion may be composed of the first straight line segment 11, the second straight line segment 12 and the circular arc segment 13, so that the explosion-proof valve 10 may burst open basically through the first straight line segment 11, the second straight line segment 12, and the circular arc segment 13, so as to meet the requirements for explosion-proof and to achieve the pressure release effect.

In an embodiment, the battery casing 20 is provided with a first mark, a second mark and a third mark, so that the battery casing 20 is formed with the first straight line segment 11, the second straight line segment 12 and the circular arc segment 13. That is, by forming the first mark, the second mark and the third mark on the battery casing 20, the battery casing 20 is thinned to form a fragile portion, so as to meet the requirement for explosion-proof and to achieve the pressure release effect. The widths of the first mark, the second mark and the third mark may be equal to the widths of the first straight line segment 11, the second straight line segment 12 and the circular arc segment 13, respectively.

It should be noted that the first straight line segment 11 may extend along the first linear direction, the second straight line segment 12 may extend along the second linear direction, and the circular arc segment 13 may extend along the circular arc direction. Correspondingly, the first mark may be extended along the first linear direction, the second mark may be extended along the second linear direction, and the third mark may be extended along the circular arc direction. In this way, after the first mark, the second mark and the third mark are formed, the first straight line segment 11, the second straight line segment 12 and the circular arc segment 13 may be respectively formed on the battery casing 20, and the first straight line segment 11, the second straight line segment 12 and the circular arc segment 13 serve as the fragile portion of the explosion-proof valve 10.

In an embodiment, the width of the first mark is in the range of 0.1 mm-1 mm, the width of the second mark is in the range of 0.1 mm-1 mm, and the width of the third mark is in the range of 0.1 mm-1 mm, so that the width of the first straight line segment 11 is in the range of 0.1 mm-1 mm, the width of the second straight line segment 12 is in the range of 0.1 mm-1 mm, and the width of the circular arc segment 13 is in the range of 0.1 mm-1 mm. That is, at least one of the first straight line segment 11, the second straight line the segment 12 and the circular arc segment 13 may be broken through under the preset pressure, and the structural strength is relatively high, such that the explosion-proof valve 10 will not explode unexpectedly when the internal pressure of the battery is not higher than the preset value.

In an embodiment, the width of the first mark may be 0.1 mm, 0.15 mm, 0.18 mm, 0.2 mm, 0.25 mm, 0.3 mm, 0.35 mm, 0.4 mm, 0.45 mm, 0.48 mm, 0.5 mm, 0.52 mm, 0.6 mm, 0.65 mm, 0.75 mm, 0.8 mm, 0.85 mm, 0.9 mm, 0.95 mm or 1 mm, etc.

The width of the second mark may be 0.1 mm, 0.15 mm, 0.18 mm, 0.2 mm, 0.22 mm, 0.3 mm, 0.35 mm, 0.4 mm, 0.45 mm, 0.48 mm, 0.5 mm, 0.52 mm, 0.6 mm, 0.65 mm, 0.7 mm, 0.8 mm, 0.85 mm, 0.9 mm, 0.95 mm or 1 mm etc.

The width of the third mark may be 0.1 mm, 0.15 mm, 0.18 mm, 0.2 mm, 0.22 mm, 0.25 mm, 0.35 mm, 0.4 mm, 0.45 mm, 0.48 mm, 0.5 mm, 0.52 mm, 0.6 mm, 0.65 mm, 0.7 mm, 0.75 mm, 0.85 mm, 0.9 mm, 0.95 mm or 1 mm etc.

In an embodiment, the thickness of the battery casing 20 is d, the depth of the first mark, the depth of the second mark, and the depth of the third mark are e, and the equation of $0.04 \text{ mm} \leq d - e \leq 1 \text{ mm}$ is satisfied. That is, the thickness of the first straight line segment 11, the second straight line segment 12 and the circular arc segment 13 ranges from 0.04 mm to 1 mm. Through such configuration, not only it may be ensured that the explosion-proof valve 10 has a certain strength, but also the explosion-proof valve 10 may burst open under a preset pressure, thereby realizing safety protection of the battery.

In an embodiment, the thicknesses of the first straight line segment 11, the second straight line segment 12 and the circular arc segment 13 may be 0.04 mm, 0.05 mm, 0.1 mm, 0.2 mm, 0.3 mm, 0.4 mm, 0.5 mm, 0.6 mm, 0.65 mm, 0.7 mm, 0.8 mm, 0.9 mm or 1 mm etc.

In an embodiment, the first mark is a gradually expanding structure, and the width of the first mark gradually increases from the bottom end of the first mark to the top end of the first mark. The second mark is a gradually expanding structure, and the width of the second mark gradually increases from the bottom end of the second mark to the top end of the second mark. The width of the third mark gradually increases from the bottom end of the third mark to the top end of the third mark. In this way, not only can at least one of the first straight line segment 11, the second straight line segment 12 and the circular arc segment 13 be broken through when the internal pressure of the battery casing 20 reaches a preset value, but also the gas and liquid in the battery casing 20 can be easily and quickly discharged from battery casing 20.

The longitudinal sections of the first mark, the second mark and the third mark may be substantially trapezoidal, or the bottom walls of the first mark, the second mark and the third mark may be substantially arcuate.

In an embodiment, the first mark may be an equidistant structure, that is, the width of the first mark is the same from the bottom end of the first mark to the top end of the first mark. The second mark may be an equidistant structure, that is, the width of the second mark is the same from the bottom end of the second mark to the top end of the second mark. The third mark may be an equidistant structure, that is, the width of the third mark is the same from the bottom end of the third mark to the top end of the third mark.

The longitudinal sections of the first mark, the second mark and the third mark may be substantially rectangular, or the bottom walls of the first mark, the second mark and the third mark may be substantially arcuate.

In an embodiment, as shown in FIG. 3, the first mark includes a first sidewall 111 and a second sidewall 112 opposite to each other, the second mark includes a third sidewall 121 and a fourth sidewall 122 opposite to each other, and the third mark includes a fifth sidewall 131 and a sixth sidewall 132 opposite to each other. The first sidewall 111, the second sidewall 112, the third sidewall 121 and the fourth sidewall 122 are all planar surfaces, and the fifth sidewall 131 and the sixth sidewall 132 are both arc surfaces. The two ends of the fifth sidewall 131 are respectively connected to the first sidewall 111 and the third sidewall 121, and the two ends of the sixth sidewall 132 are respectively connected to the second sidewall 112 and the fourth sidewall 122. The length of the first sidewall 111 and the length of the third sidewall 121 are a and b respectively, the arc length of the fifth sidewall 131 is c, and the radius of curvature of the fifth sidewall 131 is r, and/or the length of the second sidewall 112 and the length of the fourth sidewall 122 are a and b respectively, the arc length of the sixth sidewall 132 is c, and the radius of curvature of the sixth sidewall 132 is r.

The battery casing 20 is provided with a first mark, a second mark and a third mark, so as to form the first straight line segment 11, the second straight line segment 12 and the circular arc segment 13 on the battery casing 20 respectively. Therefore, the shapes of the first mark, the second mark and the third mark directly determine the shapes of the first straight line segment 11, the second straight line segment 12 and the circular arc segment 13, respectively.

The lengths of the first straight line segment 11 and the second straight line segment 12 may be equal to the lengths of the first sidewall 111 and the third sidewall 121, respectively. The arc length of the circular arc segment 13 may be equal to the arc length of the fifth sidewall 131. The radius of curvature of the circular arc segment 13 may be equal to the radius of curvature of the fifth sidewall 131. Alternatively, the lengths of the first straight line segment 11 and the second straight line segment 12 may be equal to the lengths of the second sidewall 112 and the fourth sidewall 122, respectively. The arc length of the circular arc segment 13 may be equal to the arc length of the sixth sidewall 132. The radius of curvature of the circular arc segment 13 may be equal to the radius of curvature of the sixth sidewall 132. Alternatively, the length of the first straight line segment 11 may be equal to the length of the center line between the first sidewall 111 and the second sidewall 112. The length of the second straight line segment 12 may be equal to the length of the center line between the third sidewall 121 and the fourth sidewall 122. The arc length of the circular arc segment 13 may be equal to the arc length of the center line between the fifth sidewall 131 and the sixth sidewall 132. The radius of curvature of the circular arc segment 13 may be equal to the radius of curvature of the center line between the fifth sidewall 131 and the sixth sidewall 132.

In an embodiment, as shown in FIG. 1 and FIG. 2, the number of the explosion-proof valves 10 is at least two, and the at least two explosion-proof valves 10 are located on the same side of the battery casing 20. Furthermore, the at least two explosion-proof valves 10 are located on the same surface of the battery casing 20. Therefore, the explosion-proof performance of the explosion-proof valve 10 may be improved, and the battery safety problem caused by the failure of one explosion-proof valve 10 to burst open may be avoided. By arranging the at least two explosion-proof valves 10 on the same side of the battery casing 20, it is possible to facilitate controlling the spraying direction of the gas and liquid inside the battery casing 20 after the explosion-proof valve 10 bursts open, thereby improving the safety performance of the battery.

In an embodiment, the at least two explosion-proof valves 10 are center-symmetrical about the intersection of the first diagonal direction and the second diagonal direction of the battery casing 20, such that the direction of the battery may be adjusted according to the requirement of serial connection or parallel connection of the batteries in the battery grouping process. The adjustment of the battery direction does not affect that the explosion-proof valve 10 of each battery may be located substantially in the same direction.

It should be noted that the two explosion-proof valves 10 are center-symmetrical about the intersection of the first diagonal direction and the second diagonal direction of the battery casing 20, that is, after one explosion-proof valve 10 rotates around the intersection of the first diagonal direction and the second diagonal direction by 180 degrees, the two explosion-proof valves 10 coincide with each other.

In an embodiment, as shown in FIG. 1 and FIG. 2, the battery further includes a pole assembly 30 and a cell. The cell is disposed in the battery casing 20, the pole assembly 30 is disposed on the battery casing 20, and the pole assembly 30 is connected to the cell. The pole assembly 30 and the explosion-proof valve 10 are arranged at intervals, and the pole assembly 30 and the explosion-proof valve 10 are arranged along the width direction of the battery casing 20, which can not only facilitate the subsequent connection of the pole assembly 30 and the bus bar, but also make full use of the space of the battery casing 20. In this way, it is ensured that structures such as cells may be reasonably arranged inside the battery casing 20, thereby improving the space utilization of the battery casing 20.

The pole assembly 30 and the explosion-proof valve 10 may be located at the end portion of the battery casing 20, and the explosion-proof valve 10 may be located at a corner of the battery casing 20. For example, the pole assembly 30 and the explosion-proof valve 10 may be disposed on the first surface 21. Considering that the first surface 21 is a larger surface of the battery casing 20, the first surface 21 may provide sufficient support for the pole assembly 30 to ensure the stability of the pole assembly 30.

In some embodiments, the number of the pole assembly 30 is two, the cell may have two tab portions, and the two pole assemblies 30 and the two tab portions may be electrically connected. In an embodiment, the thickness of the battery casing 20 is 0.1 mm-0.5 mm, so that the weight of the battery casing 20 may be reduced, thereby increasing the energy density of the battery.

In an embodiment, the battery casing 20 may be made of stainless steel or aluminum, which has good corrosion resistance and sufficient strength.

In an embodiment, the length of the battery is L, wherein 400 mm≤L≤2500 mm, the width of the battery is K, and the height of the battery is H, and wherein 2K≤L≤50K, and/or, 0.5H≤K≤20H.

Furthermore, the equations of 50 mm≤K≤200 mm and 10 mm≤H≤100 mm are satisfied.

Preferably, the equations of 4K≤L≤25K, and/or, 2H≤K≤10H are satisfied.

For the battery in the above-mentioned embodiments, the ratio of the length to the width of the battery is relatively large under the condition that sufficient energy density is ensured, and further, the ratio of the width to the height of the battery is relatively large.

In an embodiment, the length of the battery is L, the width of the battery is K, and the equation of 4K≤L≤7K is satisfied, that is, the ratio of the length to the width of the battery in this embodiment is relatively large, so as to increase the energy density of the battery and facilitate the formation of the battery assembly subsequently.

In an embodiment, the height of the battery is H, and the equation of 3H≤K≤7H is satisfied, the ratio of the width to the height of the battery is relatively large, and it is also convenient for the battery to be formed under the condition that sufficient energy density is ensured.

Optionally, the length of the battery may be 500 mm-1500 mm, the width of the battery may be 80 mm-150 mm, and the height of the battery may be 15 mm-25 mm.

It should be noted that the length of the battery is the dimension in the longitudinal direction of the battery, the width of the battery is the dimension in the width direction of the battery, and the height of the battery is the dimension in the height direction of the battery, that is, the thickness of the battery.

In an embodiment, the battery is a laminated battery, which is not only convenient for the battery to be grouped, but also the battery may be processed to have a longer length.

The battery includes a cell and an electrolyte, which is the minimum unit capable of performing electrochemical reactions such as charging/discharging. The cell refers to a unit formed by winding or laminating a stack portion including a first electrode sheet, a separator and a second electrode sheet. When the first electrode sheet is a positive electrode sheet, the second electrode sheet is a negative electrode sheet, and the polarities of the first electrode sheet and the second electrode sheet are interchangeable.

Specifically, the cell is a laminated cell, and the cell has a first electrode sheet that is stacked on each other, a second electrode sheet that is electrically opposite to the first electrode sheet, and a separator sheet disposed between the first electrode sheet and the second electrode sheet, so that multiple pairs of the first electrode sheets and the second electrode sheets are stacked to form a laminated cell.

Optionally, the battery may be a roll core, that is, the first electrode sheet, the second electrode sheet that is electrically opposite to the first electrode sheet, and the separator sheet disposed between the first electrode sheet and the second electrode sheet are wound to obtain a roll core.

An embodiment of the present disclosure also provides a battery assembly including the above-mentioned battery.

The battery of the battery assembly in an embodiment of the present disclosure includes an explosion-proof valve 10 and a battery casing 20. The explosion-proof valve 10 is disposed in the battery casing 20, so that when the internal pressure of the battery casing 20 reaches a preset value, the explosion-proof valve 10 may be broken through to realize explosion-proof effect. By setting the explosion-proof valve 10 as the first straight line segment 11, the second straight line segment 112 and the circular arc segment 13, and the two ends of the circular arc segment 13 are respectively connected to the first straight line segment 11 and the second straight line segment 12, it may be ensured that at least one of the first straight line segment 11, the second straight line segment 12 and the circular arc segment 13 may be broken through when the internal pressure of the battery casing 20 reaches a preset value, so as to achieve a reliable explosion-proof effect, thereby improving the safety performance of the battery assembly.

In an embodiment, the battery assembly is a battery module or a battery pack.

The battery module includes a plurality of batteries, and the battery module may further include an end plate and a lateral plate, and the end plate and the lateral plate are used for fixing the plurality of batteries.

It should be noted that a plurality of batteries may be formed into a battery module and then arranged in the battery box, and the plurality of batteries may be fixed by the end plate and the lateral plate. Multiple batteries may be directly arranged in the battery box, that is, there is no need to group multiple batteries, and under the circumstances, the end plate and the lateral plate may be removed.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising an explosion-proof valve and a battery casing, wherein the explosion-proof valve is arranged in the battery casing, the explosion-proof valve comprises a first straight line segment, a second straight line segment and a circular arc segment, and two ends of the circular arc segment are respectively connected to the first straight line segment and the second straight line segment, at least one of the first straight line segment, the second straight line segment and the circular arc segment is able to be broken through, a length of the first straight line segment and a length of the second straight line segment are respectively a and b, and an arc length of the circular arc segment is c, a radius of curvature of the circular arc segment is r, wherein $0.9 \leq a/b \leq 1.9$ and $0.5 \leq c/r \leq 2.7$, wherein the battery casing comprises two opposite first surfaces and four second surfaces disposed around the first surfaces, an area of each of the first surfaces is larger than an area of each of the second surfaces, and the explosion-proof valve is disposed in a corner region of one of the first surfaces, a number of the explosion-proof valve is at least two, and the at least two explosion-proof valves are center-symmetrical about an intersection of a first diagonal direction and a second diagonal direction of the battery casing.

2. The battery according to claim 1, wherein $1 \text{ mm} \leq a \leq 40 \text{ mm}$.

3. The battery according to claim 1, wherein a width of the first straight line segment, a width of the second straight line segment, and a width of the circular arc segment are all the same.

4. The battery according to claim 1, wherein a minimum vertical distance between the first straight line segment and a corresponding one of the second surfaces is less than 10 mm, a minimum vertical distance between the second straight line segment and another corresponding one of the second surfaces is less than 10 mm.

5. The battery according to claim 4, wherein a circular arc transition segment formed between adjacent two of the second surfaces, and a minimum vertical distance between the circular arc segment and the circular arc transition segment is less than 20 mm.

6. The battery according to claim 5, wherein at least a part of the circular arc segment protrudes toward the circular arc transition segment adjacent thereto, or the at least a part of the circular arc segment protrudes away from the circular arc transition segment adjacent thereto.

7. The battery according to claim 1, wherein the first straight line segment is substantially parallel to a corresponding one of the second surfaces adjacent thereto, and the second straight line segment is substantially parallel to a corresponding one of the second surfaces adjacent thereto.

8. The battery according to claim 7, wherein at least a part of the circular arc segment protrudes toward a circumferential edge of the one of the first surfaces.

9. The battery according to claim 1, wherein the explosion-proof valves and at least a part of the battery casing are an integrally-formed structure.

10. The battery according to claim 9, wherein the battery casing is provided with a first mark, a second mark and a third mark, such that the battery casing is formed with the first straight line segment, the second straight line segment and the circular arc segment.

11. The battery according to claim 10, wherein the first mark comprises a first sidewall and a second sidewall opposite to each other, the second mark comprises a third sidewall and a fourth sidewall opposite to each other, and the third mark comprises a fifth sidewall and a sixth sidewall opposite to each other, the first sidewall, the second sidewall, the third sidewall and the fourth sidewall are all planar surfaces, and the fifth sidewall and the sixth sidewall are both arc surfaces;

wherein two ends of the fifth sidewall are respectively connected to the first sidewall and the third sidewall, two ends of the sixth sidewall are respectively connected to the second sidewall and the fourth sidewall, a length of the first sidewall and a length of the third sidewall are respectively a and b, an arc length of the fifth sidewall is c, a radius of curvature of the fifth sidewall is r, and/or a length of the second sidewall and a length of the fourth sidewall are respectively a and b, an arc length of the sixth sidewall is c, and a radius of curvature of the sixth sidewall is r.

12. The battery according to claim 1, wherein the battery further comprises a pole assembly, and the pole assembly is disposed on the battery casing;

wherein the pole assembly and a corresponding one of the explosion-proof valves are arranged at intervals, and the pole assembly and the corresponding one of the explosion-proof valves are arranged along a width direction of the battery casing.

\* \* \* \* \*